United States Patent [19]

Morikawa et al.

[11] Patent Number: 4,461,323

[45] Date of Patent: Jul. 24, 1984

[54] BENT HONEYCOMB PIPE ASSEMBLY WITH CENTRAL PIPE

[75] Inventors: Akira Morikawa; Yoshinori Narita, both of Nagoya, Japan

[73] Assignee: NGK Spark Plug Co., Ltd., Nagoya, Japan

[21] Appl. No.: 9,903

[22] Filed: Feb. 6, 1979

Related U.S. Application Data

[63] Continuation-in-part of Ser. No. 826,089, Aug. 19, 1977, abandoned.

[51] Int. Cl.³ .............................................. F16L 9/18
[52] U.S. Cl. .................................... 138/115; 138/148; 138/172; 138/177; 138/DIG. 8; 425/162; 264/294; 264/339; 60/320
[58] Field of Search ............... 138/113, 114, 115, 148, 138/172, 177, 178, DIG. 8; 181/222, 227, 228, 267, 288, 292, 247, 248, 252, 256, 257; 60/320; 264/339, 294; 425/162, 174.4, 384

[56] References Cited

U.S. PATENT DOCUMENTS

| 1,677,714 | 7/1978 | Frease | 138/172 X |
| 3,379,221 | 4/1968 | Harry et al. | 138/172 X |
| 3,464,450 | 9/1969 | Steffenini | 138/172 X |
| 3,542,152 | 11/1970 | Adamson | 181/222 X |
| 3,642,094 | 2/1972 | Yancey | 181/227 X |
| 3,665,967 | 5/1972 | Kachnik | 138/178 X |
| 3,753,635 | 8/1973 | Barnett | 264/339 X |
| 3,779,282 | 12/1973 | Klees | 138/115 |
| 3,941,157 | 3/1976 | Barnett | 138/115 |

Primary Examiner—James E. Bryant, III
Attorney, Agent, or Firm—Sughrue, Mion, Zinn, Macpeak and Seas

[57] ABSTRACT

A bent honeycomb pipe includes an outer pipe section bent at a predetermined curvature, a bent central pipe section coaxial with the outer pipe section and a bent honeycomb-shaped section interposed between the outer and central pipe-sections, all three sections being simultaneously coextruded to form a single-piece construction.

9 Claims, 9 Drawing Figures

BENT HONEYCOMB PIPE ASSEMBLY WITH CENTRAL PIPE

BACKGROUND OF THE INVENTION

This application is a continuation-in-part of Ser. No. 826,089 filed Aug. 19, 1977, now abandoned.

FIELD OF THE INVENTION

The present invention relates to a bent honeycomb pipe assembly with a central pipe and extruding apparatus for manufacturing the same.

DESCRIPTION OF THE PRIOR ART

Straight honeycomb pipe assemblies have been preferably used as pipes for joining with other parts, e.g., an exhaust gas combustor such as an automobile engine, but a bent honeycomb pipe assembly has not been realized because its manufacture was extremely troublesome and expensive, particularly in the case where it is made of an inflexible material such as cordierite porcelain or alumina.

SUMMARY OF THE INVENTION

It is therefore an object of the invention to provide a bent honeycomb pipe assembly with a central pipe particularly suitable for joining to such a straight honeycomb pipe assembly and providing extruding apparatus for manufacturing the same relatively simple and inexpensively utilizing any extrudable material.

The preferred embodiment of the invention comprises a bent honeycomb pipe assembly having an outer pipe section bent at a substantial predetermined curvature, a bent central pipe section provided coaxially with the outer pipe section and a bent honeycomb-shaped pipe section interposed between the outer and central pipe sections, with the outer, central and honeycomb-shaped pipe sections being simultaneously coextruded to form a single piece construction.

The invention is attained by provision of an extruding apparatus comprising a cylindrical metal-pattern body including a flange portion having at its center a hole and secured to the outlet end of an extrusion guide pipe into which a molding material to be shaped is inserted under a predetermined pressure, and a truncated conical portion formed integrally with the flange portion so as to project therefrom at the side opposite to the extrusion guide pipe and having at its center a hole communicating with the hole of the flange portion, the outer circumferential portion of the hole of the truncated conical portion being provided with a plurality of honeycomb-shaped grooves and those portions of the flange portion which face the respective intersecting points of the honeycomb-shaped grooves being provided with holes each having a larger diameter than that of each corresponding intersecting point of the honeycomb-shaped grooves, thereby to define first spaces acting as extruding passageways for shaping a honeycomb-shaped pipe section of the honeycomb pipe assembly; a core inserted coaxially into the central through holes of the flange and truncated conical portions of the metal-pattern body to define therearound a second space communicating with parts of the first spaces and acting as an extruding passageway for shaping a central pipe section of the honeycomb pipe assembly integral with the honeycomb-shaped pipe section thereof; a stopper ring securing the metal-pattern body through the flange portion thereof to the extrusion guide pipe, and having a truncated conical through hole disposed coaxially above the truncated conical portion of the metal-pattern body to define therewithin a third space communicating with parts of the first spaces and acting as an extruding passageway for shaping an outer pipe section of the honeycomb pipe assembly integral with the central and honeycomb-shaped pipe sections thereof; and means for gradually differing resistances of the molding material to be shaped passing through the first, second and third spaces from one diametric end of the metal-pattern body toward the other diametric end thereof, thereby successively to bend the central, honeycomb-shaped and outer pipe sections of the honeycomb pipe assembly at a desired curvature.

Said means for gradually differing resistances of the molding material to be shaped may comprise gradually reducing the longitudinal lengths of the circumferential through holes provided in the flange portion of the metal-pattern body from its one diametric end toward the other diametric end, or may comprise differing the length of the projecting end of the truncated conical portion of the metal-pattern body gradually from its one diametric end toward the other diametric end.

The extruding apparatus of the above-mentioned construction is capable of shaping any bent honeycomb pipe assembly with a central pipe comparatively easily and inexpensively by utilizing an extrudable material which may be a flexible material such as any plastics as well as an inflexible heat-resisting material such as cordierite, mullite, porcelain, alumina or the like particularly suitable for a pipe to join with an exhaust gas combustor such as an automobile engine. A plastic material containing ceramic powder may also be used to form a bent ceramic honeycomb pipe.

DETAILED DESCRIPTION OF THE PREFERRED EMBODIMENTS

Figure 1:
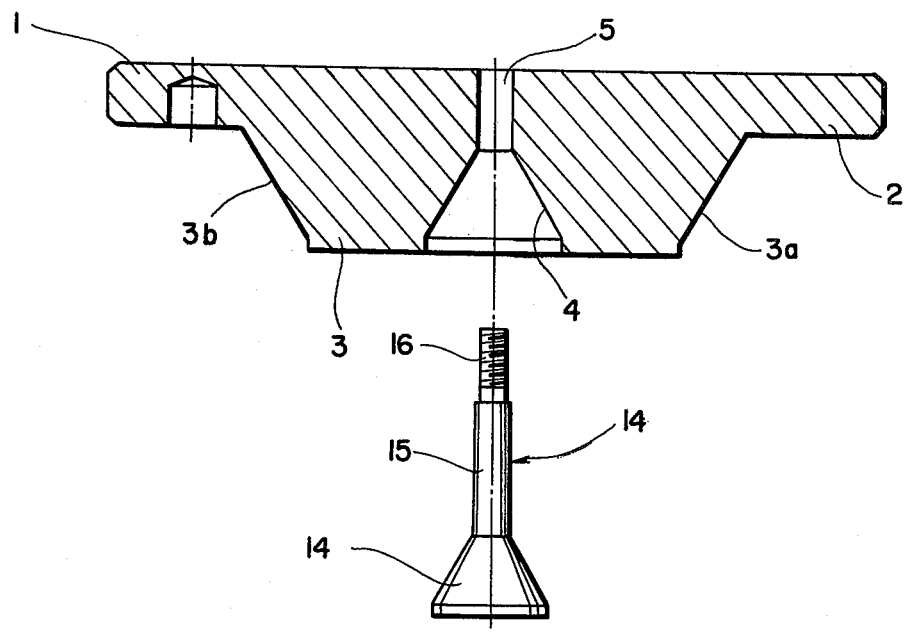
FIG. 1 shows a cross-sectional exploded view of a metal-pattern body according to one embodiment of the invention before making honeycomb-shaped grooves therein.
Figure 2:
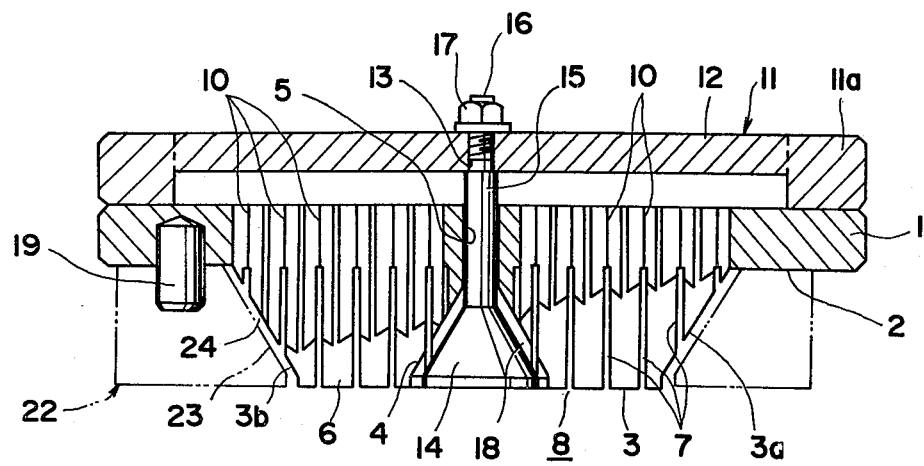
FIG. 2 shows a schematic cross-sectional view of a portion including a metal-pattern body and a reinforcing ring plate according to one embodiment of the invention.
Figure 3:
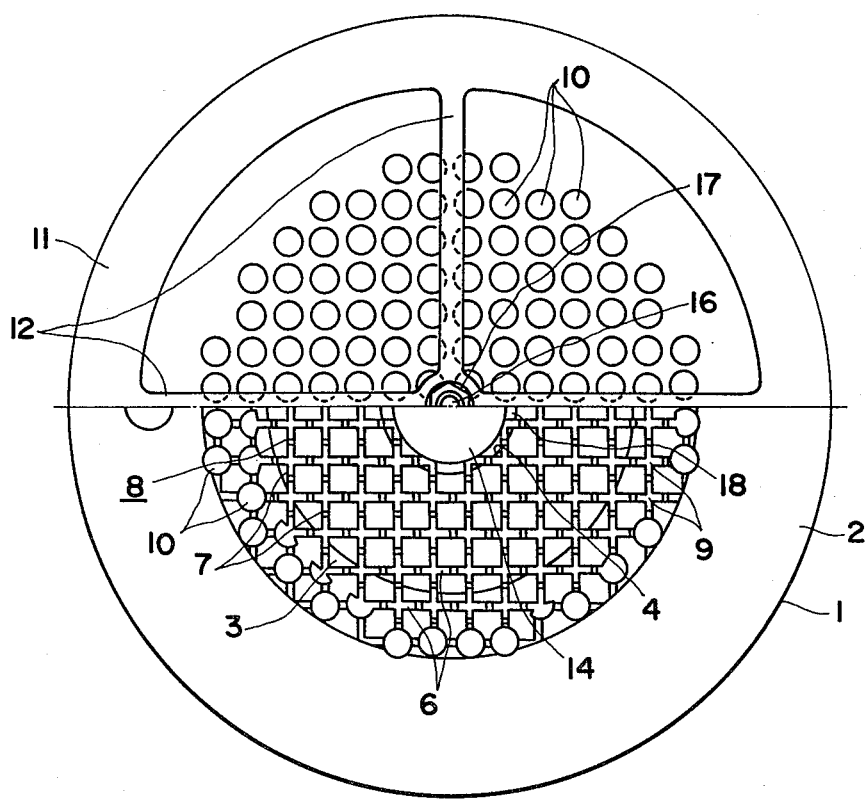
FIG. 3 shows a front plane view of FIG. 2 where the reinforcing ring plate is partially cut away.
Figure 5:
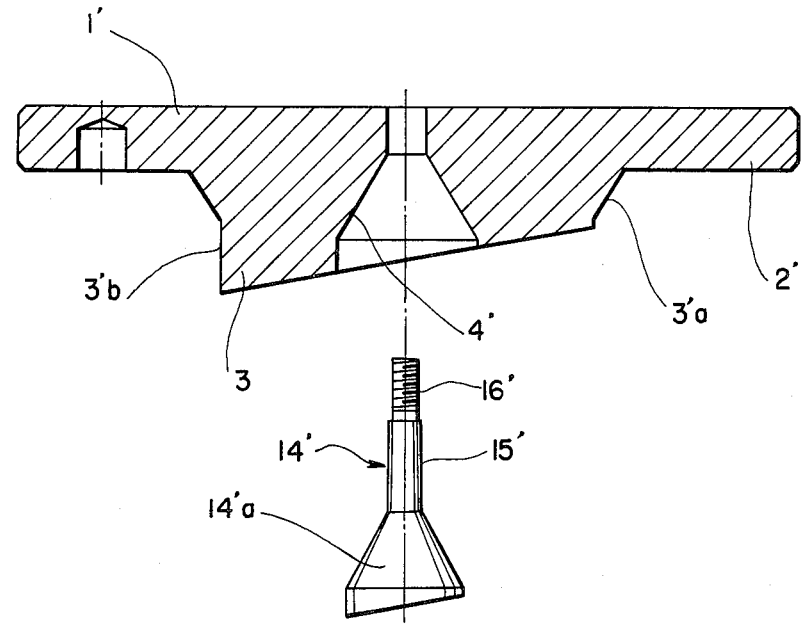
FIG. 5 shows a cross-sectional exploded view of a metal-pattern body according to another embodiment of the invention before making honeycomb-shaped grooves therein.

Referring to FIG. 1, reference numeral 1 denotes an extruding cylindrical metal-pattern body before honeycomb-shaped grooves as hereinafter described are bored. Metal-pattern body 1 is made of a heat-resisting material such as cast iron and comprises a flange portion 2 and a truncated conical portion 3 projected coaxially from one surface of flange portion 2 so as to have a gradually smaller diameter. Truncated conical portion 3 is perforated at its center with a truncated conical hole 4 so as to have a gradually smaller diameter toward flange portion 2. A straight circular hole 5 is so bored as to pass through the center of flange portion 2 starting from the small diametric end, i.e., the truncated end of conical hole 4. The outer circumferential portion of truncated conical hole 4 is formed with honeycomb-shaped grooves 8 (FIGS. 2 and 3) comprising a plurality of transversal grooves 6 each provided at a predetermined interval and a plurality of longitudinal grooves 7 each provided at a predetermined interval. Those portions of flange portion 2 which face the respective intersecting points of transversal and longitudinal grooves 6 and 7 are perforated with circular holes 10 each having a larger diameter than that of each corresponding intersecting point of transversal and longitudinal grooves 6 and 7. Holes 10 are so formed to have their lengths reduced gradually from one diametric end 3b of truncated conical portion 3 toward the other diametric end 3a thereof. A reinforcing ring plate 11 is mounted on the surface of flange portion 2 of metal-pattern body 1 opposite to truncated conical portion 3 thereof. Reinforcing ring plate 11 comprises a shallow annular ring section 11a having substantially the same diameter as that of flange portion 2 and a cross-shaped rib section 12 projected inwardly of annular ring section 11a integrally therewith slightly away from the surface of flange portion 2. The central intersecting portion of rib section 12 facing circular hole 5 bored in flange portion 2 is formed with a circular hole 13.

On the other hand, a core 14 is prepared which comprises a truncated conical head portion 14a formed to have an appropriately smaller diameter than truncated conical hole 4 provided in truncated conical portion 3, and an elongated rod-like portion 15 projected coaxially from the truncated end of head portion 14a and formed to have the same diameter as circular hole 5 of flange portion 2, a threading 16 being formed at the rear end peripheral surface of rod-like portion 15. Thus, core 14 is so inserted into truncated hole 4 and circular hole 5 with ring plate 11 disposed on flange portion 2 in a predetermined state that threading 16 passes through circular hole 13 of ring plate 11 and is then screwed by a nut 17. Thus, under this condition, an annular extruding passageway 18 for shaping an inner or central pipe section 104 (FIG. 9) of a desired honeycomb pipe assembly 101 to be described hereinafter is formed between the peripheral wall of truncated head portion 14a of core 14 and the wall surface defining truncated conical hole 4.

Figure 4:
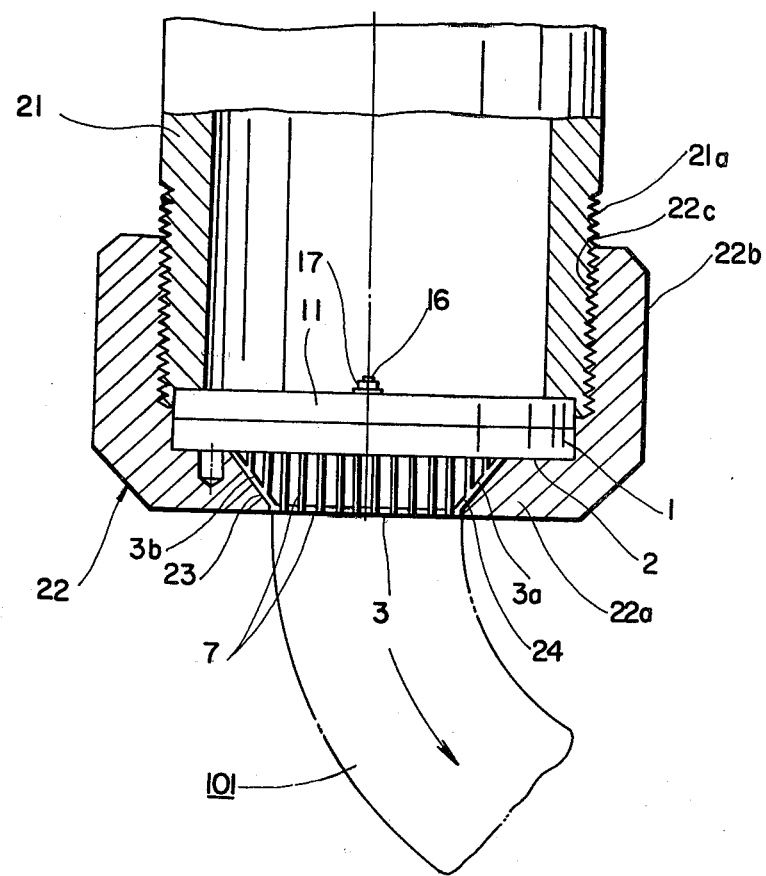
FIG. 4 shows a schematic cross-sectional side view of an extruding apparatus, partly broken away, according to one embodiment of the invention.

On the other hand, a stopper ring member 22 (FIG. 4) is prepared which comprises a small ring section 22a having at its center a truncated conical through hole 23 formed to be arranged coaxially above truncated conical portion 3 of metal-pattern body 1 and to have an appropriately larger diameter than, and the same longitudinal length as, truncated conical portion 3, and a large ring section 22b projected integrally from the other peripheral end of small ring section 22a and having substantially the same diameter as flange portion 2 of metal-pattern body 1, a female threading 22c being formed in the inner wall of large ring section 22b. Thus, under the condition where flange portion 2 of metal-pattern body 1 is contacted through reinforcing ring plate 11 with an extrusion guide pipe 21 having substantially the same diameter as reinforcing ring plate 11 and formed at its front peripheral wall portion with a male threading 21a, stopper ring member 22 is screwed to extrusion guide pipe 21 so as to press metal-pattern body 1 through reinforcing ring plate 11 toward extrusion guide pipe 21 and in the manner that small ring section 22a of stopper ring member 22 is disposed coaxially above truncated conical portion 3 of metal-pattern body 1. In this case, a positioning pin 19 may be disposed between stopper ring member 22 and flange portion 2 of metal-pattern body 1 in place of the aforesaid screwing. Thus, under this condition, an annular extruding passageway 24 for shaping an outer pipe section 102 (FIG. 9) of the desired honeycomb pipe assembly is formed between the peripheral wall of truncated conical portion 3 of metal-pattern body 1 and the wall surface defining truncated conical hole 23 of stopper ring member 22. In this case, parts of the aforesaid honeycomb-shaped grooves 8 are formed to be communicated with extruding passageways 18 and 24.

Figure 8:
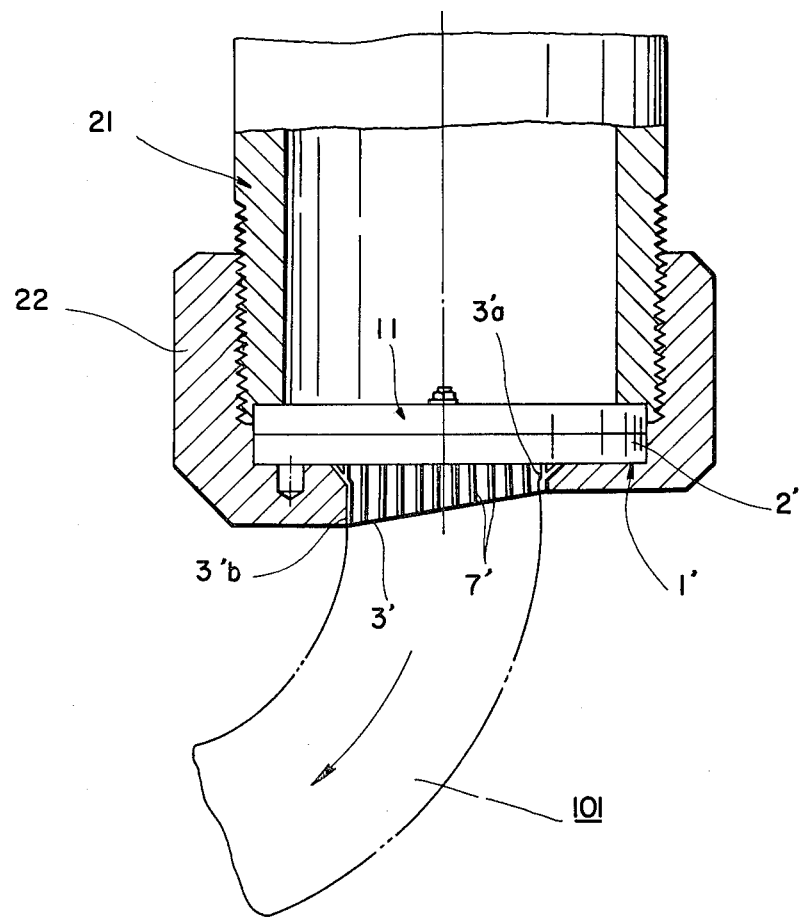
FIG. 8 shows a schematic cross-sectional side view of an extruding apparatus, partly broken away, according to another embodiment of the invention.
Figure 6:
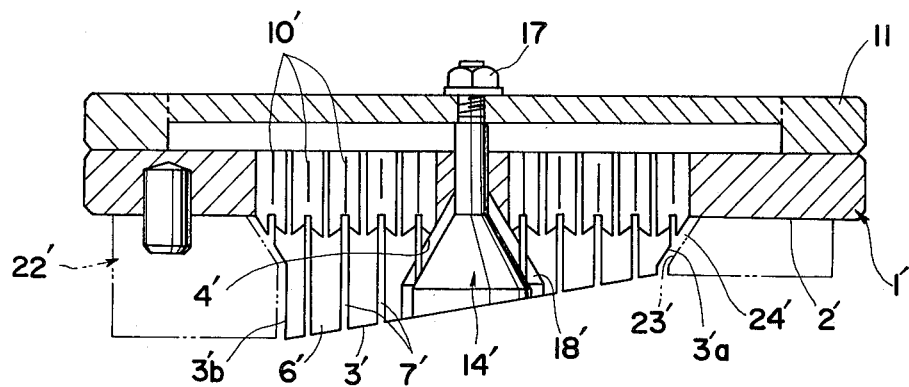
FIG. 6 shows a schematic cross-sectional view of a portion including a metal-pattern body and a reinforcing ring plate according to another embodiment of the invention.
Figure 7:
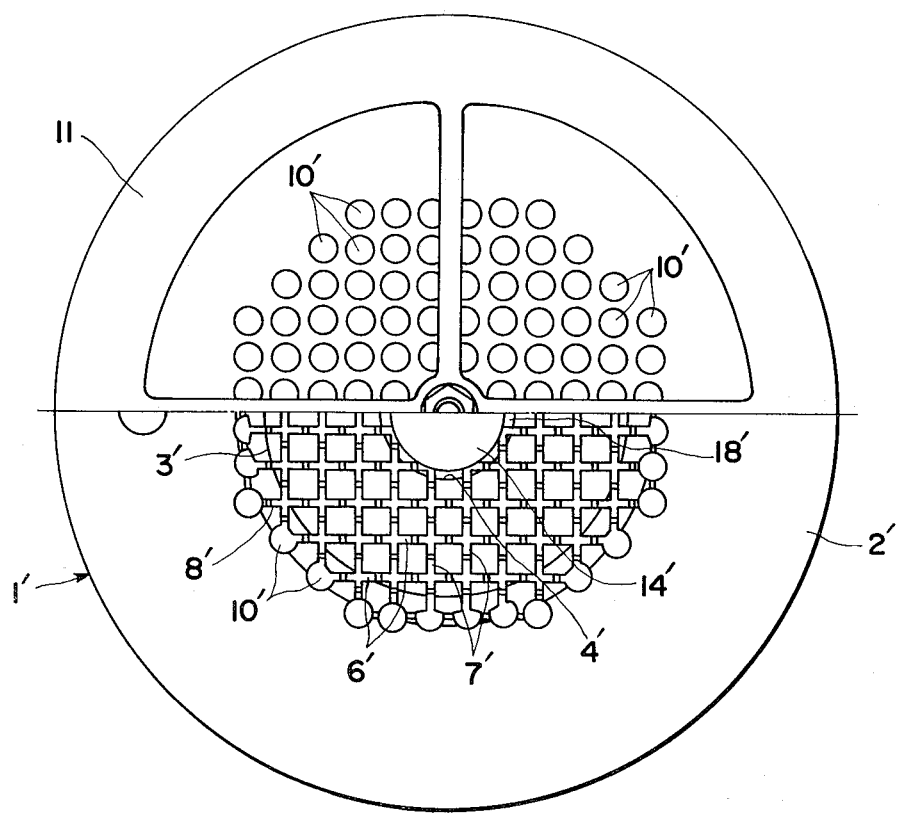
FIG. 7 shows a front plate view of FIG. 8 where the reinforcing ring plate is partially cut away.

When, under this condition, a predetermined extrudable material to be shaped is successively introduced into extrusion guide pipe 21, then central pipe section 104 is shaped through extruding passageway 18, outer pipe section 102 is shaped through extruding passageway 24, and a honeycomb pipe section 103 (FIG. 9) integral with central and outer pipe sections 104 and 102 is shaped through honeycomb-shaped grooves 8. At this time, central, honeycomb-shaped and outer pipe sections 104, 102 and 103 are each continuously bent at a predetermined curvature since the extruding speeds or resistances of the molding material to be shaped differs in response to the inclined angle defined by the longitudinal different ends of circular holes 10 from one diametric end of metal-pattern body 1 toward the other diametric end thereof. As is clearly shown in FIGS. 4, 8 and 9, the curvature of the resulting bent honeycomb pipe structure is substantial, i.e. it is more than an infinitesimal amount. Thus, a bent honeycomb pipe assembly of unitary construction is formed. As used here and in the appended claims, the term "unitary construction" describes a unit made of a single piece of material and having no adhesives or other fastening means. If a plastic material containing ceramic powders is used, the thus molded bent ceramic honeycomb pipe assembly is sintered to produce a final product.

The embodiment according to FIGS. 5-8 has the same construction as the embodiment according to FIGS. 1-4, excepting that the inclination of the longitudinal lengths of circular holes 10 for differing the extruding speeds or resistances of the plastic molding material to be shaped from one diametric end of the metal-pattern body toward the other diametric end is replaced by the corresponding inclination of each of the extruding ends of a truncated conical portion 3' of a metal-pattern body 1', a truncated conical head portion 14'a of a core 14' and a small ring section 22'a of a stopper ring member 22'. Therefore, parts of FIGS. 5-8 corresponding to those of FIGS. 1-4 are designated by the corresponding symbols and the description is omitted.

Figure 9:
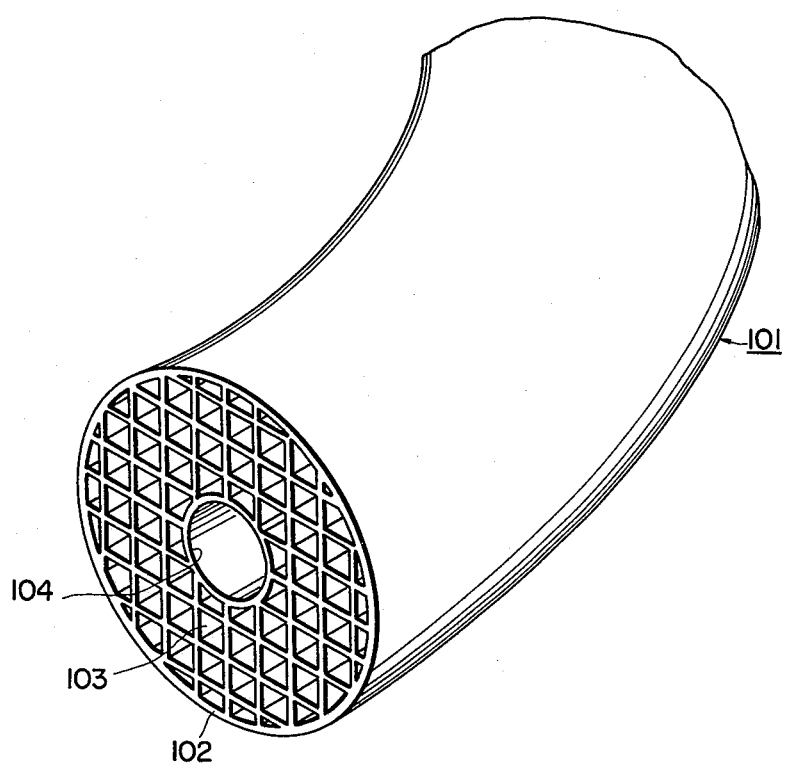
FIG. 9 indicates a perspective view of a bent honeycomb pipe assembly with a central pipe manufactured in accordance with the extruding apparatus shown in FIG. 4 or 8.

Thus, it will be understood to those skilled in the art that any desired bent honeycomb pipe assembly 101 as shown in FIG. 9 can be easily shaped according to the invention. If a molding material containing ceramic powders is used, the only necessary additional step is that the thus molded bent ceramic honeycomb pipe assembly must then be sintered to produce a final product.

In this case, it is desired that the extruding ends of truncated conical portion 3 or 3' of the metal-pattern body, truncated conical head portion 14a or 14'a of the core, and stopper ring member 22 or 22' each have a straightly extended portion, i.e., a constant diameter portion, of a predetermined length as shown in FIGS. 1, 2, 4, 5, 6 and 8.

Bent honeycomb pipe assembly 101 manufactured in accordance with the invention is particularly suitable for a pipe, e.g., to join to any straight honeycomb pipe assembly such as a pipe used to join with any exhaust gas combustor including an automobile engine. In such as case, a plastic material containing ceramic powders such as cordierite, mullite, alumina or the like is used as the extrudable material.

One concrete example of producing a bent ceramic honeycomb pipe assembly will be described in which a polyurethane resin predominently containing cordierite, mullite, alumina or the like is preferably usable as a plastic molding material to be shaped.

EXAMPLE

To 100 parts by weight of cordierite powders having an average particle size of $5\mu$ was added 50 parts by weight of water insoluble water curing-type polyurethane resin, and the mixture was kneaded to obtain a plastic molding material using a vacuum kneader. The plastic molding material was extruded using the present apparatus to obtain a bent ceramic honeycomb pipe assembly, and then the extruded pipe assembly was immersed into a water to thereby harden it. The thus obtained bent ceramic honeycomb pipe assembly was subjected to a sintering treatment described below.

(1) The pipe assembly is immediately dried.

(2) The dried pipe assembly is heated to 800° C. at a rate of 50° C./hour in reducing atmosphere.

(3) After changing the atmosphere from a reducing atmosphere to a neutral atmosphere, the pipe assembly is then heated to 1000° C. at a rate of 50° C./hour therein.

(4) Furthermore, the pipe assembly is heated to 1250° C. at a rate of 50° C./hour in an oxidizing atmosphere; and then it is continuously heated to maintain the temperature of 1250° C. for two hours. As a result, the bent ceramic honeycomb pipe assembly can be obtained.

In this case, the modulus of contraction which is caused by the sintering treatment was 12% of the whole volume, while the water absorption or was 25%.

According to the above treatment, it is possible to obtain a bent honeycomb pipe assembly made of cordierite as shown in FIG. 9.

It will be apparent that various modifications in the above-described invention are possible without departing from the essential scope of the present invention as defined in the appended claims.

What is claimed is:

1. A bent honeycomb pipe assembly with a central pipe and being of unitary construction, said pipe comprising an outer pipe section bent at a substantial predetermined curvature, a bent central pipe section provided coaxially with the outer pipe section; and a bent honeycomb-shaped pipe section interposed between the outer and central pipe sections coaxially therewith, the outer, central and honeycomb-shaped pipe sections each having an equal wall thickness over the total length, said outer, central and honeycomb-shaped pipe sections being simultaneously coextruded to form a single integral piece.

2. The bent honeycomb pipe assemby of claim 1 wherein said pipe is made of a plastic material.

3. The bent honeycomb pipe assembly of claim 1 wherein said pipe is made of an inflexible heat-resisting material.

4. The bent honeycomb pipe assembly of claim 1 wherein said pipe is made of a ceramic material.

5. The bent honeycomb pipe assembly of claim 3 wherein the inflexible heat-resisting material is cordierite procelain.

6. The bent honeycomb pipe assembly of claim 3 wherein the inflexible heat-resisting material is alumina.

7. An automobile exhaust gas pipe of unitary construction, said pipe having an outer pipe section bent at a substantial predetermined curvature, a central fluid passageway pipe section coaxially with said outer pipe section and bent at same predetermined curvature, and an adiabatic honeycomb-shaped pipe section interposed between said outer and central pipe sections coaxially therewith and bent at said predetermined curvature, said outer central and honeycomb pipe sections each having an equal wall thickness over the total length of said pipe and being simultaneously coextruded to form a single integral piece without the use of adhesives.

8. An automobile exhaust gas pipe according to claim 7 made of a plastic material.

9. An automobile exhaust gas pipe according to claim 7 made of an inflexible heat-resisting material.

* * * * *